United States Patent
Lucic

(10) Patent No.: US 11,403,387 B2
(45) Date of Patent: Aug. 2, 2022

(54) SYSTEMS AND METHODS FOR AUTHENTICATING USER INFORMATION

(71) Applicant: BANK OF MONTREAL, Toronto (CA)

(72) Inventor: Romulus Lucic, Toronto (CA)

(73) Assignee: BANK OF MONTREAL, Toronto (CA)

(*) Notice: Subject to any disclaimer, the term of this patent is extended or adjusted under 35 U.S.C. 154(b) by 398 days.

(21) Appl. No.: 16/733,706

(22) Filed: Jan. 3, 2020

(65) Prior Publication Data

US 2020/0218797 A1    Jul. 9, 2020

Related U.S. Application Data

(60) Provisional application No. 62/788,586, filed on Jan. 4, 2019.

(51) Int. Cl.
*G06F 21/45* (2013.01)
*G06F 16/958* (2019.01)
*G06F 16/951* (2019.01)

(52) U.S. Cl.
CPC ........... *G06F 21/45* (2013.01); *G06F 16/951* (2019.01); *G06F 16/958* (2019.01); *G06F 2221/2115* (2013.01)

(58) Field of Classification Search
CPC ...... G06F 21/45; G06F 16/951; G06F 16/958; G06F 2221/2115; G06F 2221/2117
See application file for complete search history.

(56) References Cited

U.S. PATENT DOCUMENTS

| | | | |
|---|---|---|---|
| 9,015,156 B2* | 4/2015 | Dies | G06F 16/9535 707/728 |
| 2008/0103972 A1* | 5/2008 | Lanc | G06Q 20/32 705/44 |
| 2013/0091052 A1* | 4/2013 | Kaperdal | G06Q 20/405 705/39 |
| 2014/0122456 A1* | 5/2014 | Dies | G06F 16/951 707/723 |
| 2018/0114277 A1* | 4/2018 | Whitmer | G06F 21/31 |
| 2018/0205725 A1* | 7/2018 | Cronkright | G06F 16/951 |
| 2018/0300364 A1* | 10/2018 | Xu | G06F 16/951 |

FOREIGN PATENT DOCUMENTS

CN        106529938        3/2017

OTHER PUBLICATIONS

Examination Report for CA 3066451 dated Apr. 6, 2021 (5 pages).
Examination Report for CA 3066451 dated Jan. 20, 2022 (4 pages).

* cited by examiner

*Primary Examiner* — Cheng-Feng Huang
(74) *Attorney, Agent, or Firm* — Foley & Lardner LLP

(57) ABSTRACT

Disclosed herein are efficient systems and methods for verification of user information in a timely manner. A background computer process for verification of the user information using a third-party authentication service is initiated. The third-party authentication service performs the verification of the information submitted by the user in response to some of the questions within the questionnaire at the same time as the user is replying to remaining questions within the electronic questionnaire. Accordingly, by the time the user is finished replying to all questions within the electronic questionnaire, the previously submitted information by the user is verified and a profile of the user is authenticated.

20 Claims, 2 Drawing Sheets

SYSTEMS AND METHODS FOR AUTHENTICATING USER INFORMATION

CROSS-REFERENCE TO RELATED APPLICATIONS

This application claims priority to U.S. Provisional Application Ser. No. 62/788,586, filed Jan. 4, 2019, which is incorporated herein by reference in its entirety.

TECHNICAL FIELD

The subject matter described herein relates generally to authentication systems, and more specifically directed towards systems and methods for authenticating information associated with a user in a background process.

BACKGROUND

With growing use of Internet and online services, companies (e.g., retail stores, banks) offer services for opening a new account remotely in order to avoid having to physically visit a physical location. Using an online account opening service, a user can provide account application information (e.g., personal information) that meets the company's requirements for identity verification. The company must then verify the information of the user for determining whether the user is eligible for the new account. Because the user is physically remote from the company and cannot provide physical account verification or authorization, the customary methods of identification verification, which are available in face-to-face transactions, are not suitable for such electronic transactions.

In a conventional online enrollment process, the company requests that the user first register with an account verification service, which is typically a company performing online identification verification. The user may register with the account verification service, and upload personal and other necessary information for the identification verification. The account verification service may process all information associated with the user and generate a verification report. The user may download the verification report. The user may upload the verification report on a web portal of the online account opening service so that the company can determine whether the user is eligible for the new account. In this online enrollment method, the identification verification process of the user is extremely time-consuming, which creates a negative user experience.

SUMMARY

What is therefore desired are efficient systems and methods for verification of user information during an enrollment process in a more timely manner. To enable that the information submitted by the user in an electronic questionnaire during the enrollment process is verified in a timely manner, a background computer process for verification of the user information using a third-party authentication service is executed. The third-party authentication service may perform the verification of the user information, submitted by the user in response to some of the questions within the electronic questionnaire, at the same time as the user is responding to remaining questions within the electronic questionnaire. Consequently, by the time the user may have finished replying to all questions within the electronic questionnaire, the previously submitted information by the user may be verified and a profile of the user may be authenticated.

In an embodiment, a method may include upon displaying, on a web-based application executing on an electronic device, a questionnaire comprising a plurality of input elements, receiving, by a server from the electronic device, a plurality of data inputs, the server further receiving a request generate a first electronic profile associated with a user operating the electronic device. The method may include while the questionnaire is displayed on the web-based application, causing, by the server using a background process not visible to the user, a third-party authentication website to generate a second electronic profile associated with the user by: accessing, by the server, the third-party authentication website; identifying, by the server, one or more input fields of the third-party authentication website; transmitting, by the server, the plurality of data inputs to corresponding input fields within the third-part authentication website; and transmitting, by the server, a first instruction to cause the third-party authentication website to generate the second electronic profile, wherein the third-party authentication website generates an authentication score for the user based on the second electronic profile. The method may further include upon the authentication score satisfying a predetermined threshold value, generating, by the server, the first electronic profile using the plurality of data inputs. The method may further include, while a representation of the first electronic profile is displayed on the web-based application executing on the electronic device, causing, by the server using a background process not visible to the user, the third-party authentication website to deactivate the second electronic profile by: accessing, by the server, the third-party authentication website; and transmitting, by the server, a second instruction to cause the third-party authentication website to deactivate the second electronic profile.

In another embodiment, a system may include a server configured to, upon displaying, on a web-based application executing on an electronic device, a questionnaire comprising a plurality of input elements, receive from the electronic device a plurality of data inputs, the server further receiving a request generate a first electronic profile associated with a user operating the electronic device. The server is further configured to, while the questionnaire is displayed on the web-based application, cause using a background process not visible to the user a third-party authentication website to generate a second electronic profile associated with the user by: accessing the third-party authentication website; identifying one or more input fields of the third-party authentication website; transmitting the plurality of data inputs to corresponding input fields within the third-part authentication website; and transmitting a first instruction to cause the third-party authentication website to generate the second electronic profile, wherein the third-party authentication website generates an authentication score for the user based on the second electronic profile. The server is further configured to, upon the authentication score satisfying a predetermined threshold value, generate the first electronic profile using the plurality of data inputs. The server is further configured to, while a representation of the first electronic profile is displayed on the web-based application executing on the electronic device, cause using a background process not visible to the user the third-party authentication website to deactivate the second electronic profile by: accessing the third-party authentication website and transmitting a second instruction to cause the third-party authentication website to deactivate the second electronic profile.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

DETAILED DESCRIPTION

Figure 1:
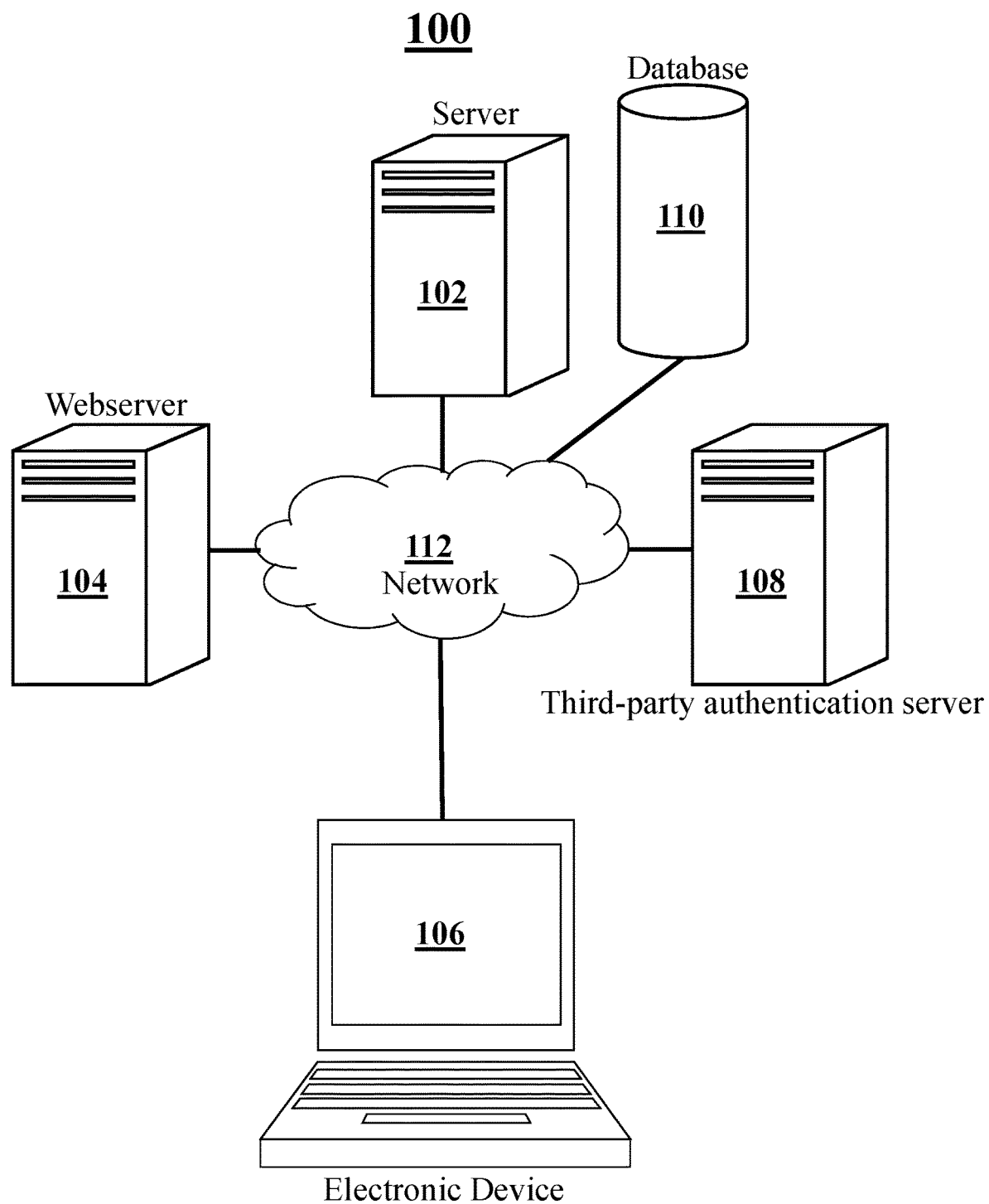
FIG. 1 shows components of a system for authenticating identification data of a user, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods that may provide an efficient and a secure technique for opening a user account by authenticating a user using a third-party authentication application program running as a background process on a separate server. The systems and methods described herein may include an electronic device, which may execute a web-based application to open the account. The user operating the electronic device may command the web-based application running on the electronic device to access an enrollment page having an electronic questionnaire. The user may submit personal information and other data, in response to multiple questions presented within the electronic questionnaire. The electronic questionnaire may be associated with an online application request for opening the account (e.g., opening a bank account with a bank). Upon the submission of a limited amount of data by the user for a predetermined number of questions within the questionnaire, a webserver than runs the web-based application may transmit the limited data to a server. As the user is answering remaining questions in the questionnaire, in the background process, the server initiates authentication of information within the limited data. The server may execute a series of authentication protocols to verify the information within the limited data and an identity of the user based on the limited data. For instance, upon receipt of the limited data, the server may promptly transmit the limited data of the user to a third-party authentication server. The third-party authentication server may process the limited data to generate an authentication profile of the user. The third-party authentication server may execute a scoring algorithm to generate an authentication score corresponding to the authentication profile. The authentication score may be assigned based on an amount of valid and correct information present within the limited data. The third-party authentication server may transmit the authentication score to the server. The server may compare the authentication score with a predetermined threshold value stored in a database. When the authentication score satisfies the predetermined threshold value, the server may approve the application request of the user. The server may create an account profile of the user, and in the background process, the third-party authentication server may deactivate the authentication profile of the user. Once the user is finished answering all questions in the questionnaire, the server may display the account profile on a user interface of the electronic device.

FIG. 1 shows components of a system 100. The system 100 may include a server 102, a webserver 104, an electronic device 106, a third-party authentication server 108, and a database 110. The server 102, the webserver 104, the electronic device 106, the third-party authentication server 108, and the database 110 are connected to each other through a network 112. The examples of the network 112 may include, but are not limited to, private or public LAN, WLAN, MAN, WAN, and the Internet. The network 112 may include both wired and wireless communications according to one or more standards and/or via one or more transport mediums. The communication over the network 112 may be performed in accordance with various communication protocols such as transmission control protocol and internet protocol (TCP/IP), user datagram protocol (UDP), and IEEE communication protocols. In one example, the network 112 may include wireless communications according to Bluetooth specification sets, or another standard or proprietary wireless communication protocol. In another example, the network 112 may also include communications over a cellular network, including, e.g. a global system for mobile communications (GSM), code division multiple access (CDMA), and enhanced data for global evolution (EDGE) network.

A server 102 may be any computing device comprising a processor and non-transitory machine-readable storage medium and capable of performing various authentication tasks and authentication processes described herein during execution. Non-limiting examples of the server 102 may include a desktop computer, a server computer, a laptop computer, a tablet computer, and the like. For ease of explanation, the FIG. 1 shows a single computing device functioning as the server 102. However, it should be appreciated that some embodiments may comprise any number of computing devices capable of performing the various tasks described herein.

The server 102 may be coupled to a webserver 104 and/or an electronic device 106 operated by a user via one or more internal or external networks 112. When the network connection is established, the server 102 may receive a notification from the electronic device 106. In alternate embodiments, the webserver 104 may receive the notification from the electronic device 106. The webserver 104 may then transmit the notification to the server 102. The notification may include a request to create an account profile of the user with a financial company. The account profile of the user will enable the user to open an account such as checking account with the financial company. On receipt of the notification, the server 102 may process information associated with the request. During processing of the information associated with the request, the server 102 may determine a type of the account the user wants to open. Based on the type of the account, the server 102 may further determine a type of questionnaire associated with the type of the account from a database 110. All types of the questionnaires associated with all types of the accounts such as a checking account and a saving account are stored in the database 110.

Upon the complete processing of the information associated with the request, the server 102 may then approve the request. Upon the approval of the request, the server 102 may display a questionnaire corresponding to the request on a user interface of the electronic device 106. In alternate embodiments, upon approval of the request, the server 102 may generate and transmit instructions to the webserver 104 to display the questionnaire on the user interface of the electronic device 106. The server 102 may either transmit a name of the questionnaire or the questionnaire itself to the web server 104. On receipt of the instructions, the web server 104 may then display the questionnaire on the user interface of the electronic device 106. The questionnaire may include an application for opening the account with the financial company. The questionnaire may correspond to an electronic form. The electronic form may include multiple input elements. The multiple input elements may include multiple input fields and questions. The multiple input fields and questions may be associated with personal and financial information of a new customer.

The server 102 may receive data inputs from the electronic device 106 as and when each data input is inputted by the user on the user interface of the electronic device 106. The data inputs are answers submitted by the user while replying to multiple questions in the questionnaire displayed on the user interface of the electronic device 106. When the user submits a first data input in response to a first question, the electronic device 106 may instantaneously transmit the first data input to the server 102. In alternate embodiments, the webserver 104 may receive the multiple data inputs from the electronic device 106 as and when each data input is inputted by the user on the user interface of the electronic device 106. The webserver 104 may then transmit the multiple data inputs to the server 102. In alternate embodiments, the server 102 may itself extract the multiple data inputs from the user interface as the user is submitting answers to the questions within the questionnaire. The server 102 may perform the extraction of the data inputs from the user interface after the user have submitted answers to a specific set and type of questions presented within the questionnaire. In alternate embodiments, the server 102 may perform the extraction of the data inputs from the user interface after the user have submitted answers to a predetermined number of questions presented within the questionnaire. In such a case, the server 102 may constantly monitor the operations of the user by continuously web crawling or scraping the user interface to extract content mentioned on the user interface, and analyzing the content. Upon analysis of the content, when the server 102 determines that the user have submitted answers for the predetermined number of questions, the server 102 may then extract all the submitted data inputs from the user interface. In alternate embodiments, the server 102 may perform the extraction of the data inputs from the user interface after the user have spent a predetermined amount of time working on the questionnaire. In order to track the time period, the server 102 may trigger a timer as soon as the questionnaire is displayed on the user interface. The timer may include a processor, and is installed in the electronic device 106. After the predetermined period of time elapses as per the timer, the processor of the timer may notify the server 102. The server 102 may then execute an extraction algorithm to extract all the data inputs that have been inputted by the user from the user interface.

The server 102 on obtaining the data inputs may initiate a background authentication process to verify all information submitted by the user in the obtained data inputs. The information may include personal data such as data of birth, social media profiles, education and professional qualifications. The information may further include sensitive data such as credit and debit card numbers. The background authentication process is a computer process that runs behind the scenes (i.e., in the background while the user is working on remaining questions within the questionnaire) and without user intervention. The background authentication process is a child process created by a server 102 for processing computing task of verifying all the information already submitted by the user as the user is still working on answering remaining questions in the questionnaire. After the background authentication process is initiated, a third-party authentication website running on a third-party authentication server 108 performs the verification task independent of the control process of the server 102. Accordingly, the server 102 is free of performing other designated task such as operating a web-based application displaying the questionnaire while the third-party authentication server 108 verifies all the information already submitted by the user. In addition to operating the web-based application, the server 102 is also extracting the data inputs from the user interface, and transmitting the data inputs to the third-party authentication server 108 that is verifying the information of the user. The server 102 may also transmit a value of time period in which the verification of the information of the user has to be completed. The value may correspond to an approximate value of time a user may take to complete the questionnaire. Prior to transmitting the data inputs and the value of time period to the third-party authentication server 108, the server 102 may store the data inputs in the database 110. The server 102 may encrypt sensitive information within the data inputs, and store the encrypted data inputs in the database 110.

The server 102 in order to communicate with the third-party authentication website will first access the third-party authentication website. The third-party authentication website is hosted by the third-party authentication server 108. The server 102 will transmit a request to the third-party authentication server 108 to access the third-party authentication website. The third-party authentication server 108 processes the request, and takes the specific action requested by server 102 relative to the requested third-party authentication website. The request may be directed towards accessing a secure third-party authentication website. The third-party authentication server 108 may accept the request, and a communication is established between the server 102 and the third-party authentication website.

When the communication is established between the server 102 and the third-party authentication website, the server 102 may parse and/or scrape the third-party authentication website to identify one or more input fields on multiple webpages of the third-party authentication website. The one or more input fields may be fillable fields. In alternate embodiments, the server 102 may trigger a camera to capture an image of various webpages of the third-party authentication website. An image of each webpage may include multiple input fields providing information related to a name field, a contact information field, etc. The server 102 may process each image. For example, the server 102 may determine whether the image is already pre-cropped and binarized. The server 102 upon determining that the image is not pre-cropped and binarized, the server 102 may then pre-process the image to frame, crop, binarize and clean up the image for geometric correction. The preprocessing may include a preliminary data capture of, e.g., text of input fields in the image. In alternate embodiments, the server 102 may perform a preliminary data capture in the image based on a keyword-based search. The input fields in the image may have a keyword associated with it. For example, a name input field in the image may have a keyword associated with it such as a username. The different keywords may be used to locate the various input fields location on the multiple images. The server 102 may search for the keywords in an OCR version of the images, for example, by executing a Fuzzy Matching technique.

The server 102 may call upon one or more classifiers. The classifiers may operate on an object model and also alter the object model's state in order to record their conclusions. A classifier examines an input item such as an electronic form, a form field, a set of form field, etc. on the third-party authentication website, and chooses from a list of possible classifications the one that most likely describes the input field. The classifier may also return a confidence level for its classification. The classifiers may use machine learning techniques to perform their classification tasks while identifying the various input fields. The machine learning techniques may allow the classifiers to be initially constructed, and then adapt to specific domains by being trained to recognize the input fields from various third-party authentication websites. The classifiers may also call upon other classifiers and other program code, with other program code also calling upon classifiers, alternatively using machine learning techniques to arrive at effective arrangements.

Once all input fields are identified, the server 102 may transmit the data inputs to corresponding input fields within the third-party authentication website. For instance, an input field may be a social security number field. The server 102 may then search all captured data associated with the user from the database 110 to retrieve the social security number of the user. Upon retrieving the social security number, the server 102 may then populate the social security number field with the social security number of the user. In alternate embodiments, the server 102 may execute a mapping protocol that may map identified input fields to the data inputs of the user stored in the database 110. The mapping is logical by associating, for example, a "social security number" entry input field on the third-part authentication website with a "social security number" data input in the database 110. The mapping is also physical, for example, by identifying the position of the input field in the third-party authentication website, and creating an electronic data entry field associated with that position. Once all the input fields in the third-party authentication website are filled with the data inputs, the server 102 may transmit and execute instructions causing the third-party authentication server 108 to create an authentication profile of the user. The authentication profile of the user may be a temporary account of the user. The authentication profile may include some or all the information from the data inputs inputted by the server 102.

The third-party authentication server 108 may generate the authentication profile based on behavior of the user, and then assign an authentication score based on the evaluation of the authentication profile. The third-party authentication server 108 may determine the behavior of the user based on processing of the received data inputs. In one instance, the third-party authentication server 108 may collect the behavior information of the user from one or more public information databases or other sources that track user behavior using the data inputs. In another instance, the third-party authentication server 108 may execute web crawlers adapted to scan the online public and private information of the user. The web crawlers may gather public information and application programming interfaces used to collect and store social network information shared by the user within the data inputs. Once the third-party authentication server 108 collects and analyzes the public and private information of the user, the third-party authentication server 108 may determine the behavior of the user. The behavior may indicate the tendency of the user to engage in risky conduct (e.g., to delaying payments for existing loans, criminal cases, etc.). Once the third-party authentication server 108 has determined the behavior and other data, the third-party authentication server 108 may generate the authentication profile of the user.

The third-party authentication server 108 may execute an automated process to assign the authentication score for the authentication profile. The automated process may include a scoring algorithm based on key data points that may be gathered by the web crawlers. The key data points collected through the web crawlers may trace the public and private information of the user, and correlate against the data inputs, which contains information provided by the user via the input fields completed in the online request form. The identifying information sections of the online request form that are compared to the online information may include, but are not limited to: name, address, personal contacts, SSN, residential history, employment information, financial information, etc. In addition, other online information may be utilized for obtaining the authentication score, like credit history, etc. The scoring algorithm may calculate the authentication score for the user based on the information provided by the user in the online request form compared to the key data points. The third-party authentication server 108 may store the authentication profile, and the authentication score associated with the authentication profile in the database 110.

The server 102 may retrieve the authentication score associated with the authentication profile from the database 110. In alternate embodiments, the third-party authentication server 108 may transmit the authentication score associated with the authentication profile to the server 102. The server 102 may then compare the authentication score with a predetermined threshold value. The predetermined threshold value is stored in the database 110. When the server 102 determines that the authentication score is less than the predetermined threshold value, the server 102 may require more additional verification steps for authentication of the information of the user. The server 102 may instruction the third-party authentication server 108 to execute additional verification steps for verifying the information associated with the user. However, when the server 102 determines that the authentication score is greater than the predetermined threshold value, the server 102 may authenticate and/or validate the information provided by the user. The server 102 may then approve the request to create the account profile of the user with the financial company. Upon approval of the request, the server 102 may then generate and transmit instructions to the third-party authentication server to deactivate the authentication profile of the user. The third-party authentication server 108 may then deactivate the authentication profile of the user. The third-party authentication server 108 may also delete the authentication profile of the user stored in the database 110. At the same time, the server 102 may also generate the account profile of the user. The server 102 may then display the account profile on a user interface of the electronic device 106. The server 102 may wait for the user to finish answering all the questions within the questionnaire prior to displaying the account profile on a user interface of the electronic device 106. The account profile may then be displayed in a pop-up window, a drop down menu, etc. on the user interface.

A webserver 104 may be hosting a web-based application accessible to an electronic device 106 via a network 112 such as the Internet. The web-based application may be a website. The website may display webpages containing various questionnaires. The questionnaires may correspond to electronic forms. The electronic forms may include multiple questions. The webserver 104 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single webserver 104, one having skill in the art would appreciate that in some embodiments the webserver 104 may include any number of computing devices operating in a distributed computing environment.

The webserver 104 may communicate with a server 102 and a database 110 via one or more internal or external networks 112. When the network connection is established, the webserver 104 may generate and serve webpages presenting the questionnaires to the electronic device 106. The webserver 104 may be instructed to generate webpage content, access or generate data such as the questionnaires stored in the database 110, according to a user request. In operation, the webserver 104 may execute software applications configured to host the web-based application or a website (e.g., Apache®, Microsoft IIS®), which may generate and serve various webpages to the electronic device 106 according to the user request. The webpage may display a questionnaire. The questionnaire may be an online request electronic form, for example, an online account application. The online request electronic form may allow the server 102 to collect the identity and other information of the user. The identity information of the user may be any type of information, including, but not limited to, a name, an address, personal contacts, a social security number ("SSN"), residential history, employment information, financial information, other identifying information, and combinations thereof. The online request electronic form may have a section adapted to allow the user to opt into sharing private online information with the server 102 during the questionnaire process. The online information may be any online public or private information, including, but not limited to, being public and non-public or private shared information. The online information may be any online public or private information of the user including open source information, social network information, online application information, other online private and public information, information gathered by a social network connection application, and combinations thereof. The social network information may include any social network information, including, but not limited to, Facebook®, Myspace®, Twitter®, Linkedin®, other social media sites, and any other social space information.

The webserver 104 may generate a record for an interaction between the electronic device 106 and the webserver 104. The record may contain data related to the interaction, such as an identifier, a timestamp, a user identifier, and source device information identifying the electronic device 106 (e.g., IP address, MAC address). The record may further contain a plurality of inputs received from the electronic device 106. The plurality of inputs may be answers submitted by the user for various input elements or questions within the questionnaire. The webserver 104 may store the records locally or in the database 110. As and when the user is submitting the answers, the web server 104 may transmit the answers to the database 110 and update the records associated with the user. Once the webserver 104 store a new record in the database 110 or an existing record in the database 110 is updated, the webserver 104 or a processor of the database 110 transmits a notification to the server 102. The notification may indicate that a new record has been stored or the existing record is updated within the database 110. The server 102 may then access the records of the user from the database 110, and request a third-party authentication server 108 to verify the records of the user. The server 102 may cause the third-party authentication server 108 to verify the records of the user in a background process such that the user of the electronic device 106 working on the questionnaire is not aware about running of the verification process at the third-party authentication server 108.

An electronic device 106 may be a computing and/or telecommunication device comprising a processor and capable of performing the various tasks and processes described herein, such as accessing a webserver 104 and providing a graphical user interface to a user to interact with a web-based application. The web-based application may present webpages displaying various questionnaires. Non-limiting examples of the electronic device 106 may include a client computer (e.g., desktop, laptop, server, tablet), a telephone (e.g., cellular telephone, smartphone), or any other telecommunications or computing device used to communicate with system services.

The electronic device 106 may interact with the server 102 via the webserver 104. In some embodiments, the electronic device 106 may interact with the webserver 104 via the server 102. In some embodiments, the electronic device 106 may directly interact with the server 102. The electronic device 106 may execute an Internet browser or a local web application using a web browser that accesses the webserver 104 in order to issue requests or instructions to the server 102 to access the questionnaires. The web browser may communicate with the webserver 104 over the network 112 such as the Internet. Examples of the web browsers include Safari®, Internet Explorer®, Firefox®, Netscape® and the like. Additionally, other vendors have developed or will develop web browsers that will be suitable for use with the various preferred embodiments. Regardless of the specific form of implementation, web browser provides access, including a user interface, to allow individuals and entities to interact with the webserver 104, including via the network 112.

As an example of the electronic device 106 operation, the electronic device 106 may execute an Internet browser that accesses the webserver 104 hosting a web-based application that allows the user to access an enrollment page containing various questionnaires. The questionnaire may correspond to an electronic form for opening an account. Using the electronic device 106, the user may select a particular questionnaire on the user-centric website or web-based application. In response to the user selection, said questionnaire is then downloaded from the webserver 104 and displayed on the user interface of the electronic device 106. The electronic device 106 may include a number of input devices to submit data inputs as answers to various questions of the questionnaire. The input devices of the electronic device 106 may include a mouse, keyboard, touchscreen, stylus, etc. The server 102 and/or the webserver 104 may then parse the user interface of the electronic device 106 to extract all the data inputs submitted by the user. In one embodiment, the server 102 and/or the webserver 104 may continuously monitor the operations of the user on the electronic device 106, and as and when the user interface is updated by the user inputs, the server 102 and/or the web server 104 may extract the user inputs from the user interface. In another embodiment, the electronic device 106 may monitor its user interface, and when the user submits any answer to the question displayed on the user interface, the electronic device 106 may transmit a notification to the server 102 and/or the webserver 104. On receiving the notification, the server 102 and/or the webserver 104 may then parse the user interface of the electronic device 106 to extract the inputs.

A third-party authentication server 108 may host a third-party authentication website accessible to a server 102 via a network 112 such as the Internet. The third-party authentication website may be linked to multiple private and public security databases. The third-party authentication server 108 may be any computing device comprising a processor and non-transitory machine-readable storage capable of executing the various authentication tasks and verification processes described herein. Non-limiting examples of such computing devices may include workstation computers, laptop computers, server computers, laptop computers, and the like. While the system 100 includes a single third-party authentication server 108, one having skill in the art would appreciate that in some embodiments the third-party authentication server 108 may include any number of computing devices operating in a distributed computing environment.

The third-party authentication website may include multiple data fields that may be populated by the server 102 using the data inputs provided by the user. Once the data fields are populated, the third-party authentication server 108 may generate an authentication profile of a user containing multiple attributes corresponding to the user. The attributes may include a financial history of the user, a tax history of the user, a social history of the user, etc. The third-party authentication server 108 may then execute algorithms to determine an authentication score of the user based on evaluation of each attribute of the authentication profile. In alternate embodiments, the third-party authentication server 108 may calculate a score for each attribute within the authentication profile of the user. The third-party authentication server 108 may add up the scores for all attributes, can take the average or median score for all attributes, or can otherwise apply the individual scores to calculate an overall authentication score for the user.

The server 102 may continue to populate the unfilled data fields as and when the server 102 receives new data inputs inputted by the user from the electronic device 106. Upon filling the new data inputs in the data fields, the third-party authentication server 108 may update the authentication profile of the user by modifying a number of attributes and/or information associated to each exiting attribute. The third-party authentication server 108 may then update the authentication score based on the new evaluation of the updated authentication profile. The third-party authentication server 108 may store the updated authentication score in the database 110. The third-party authentication server 108 may then transmit a notification to the server 102 that the updated authentication score has been stored into the database 110.

A database 110 may be hosted on one or more server computing devices. The database 110 may store data records associated with various aspects of the application services offered to end users. The database 110 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the server 102. Non-limiting examples of what may be stored in the database 110 may include questionnaires, various questions, data inputs of the user, document records of the user that may comprise machine-readable computer files (e.g., word processing files), parsed portions of such computer files, or metadata associated with computer files, and web-based application data that may include software instructions executed by the server 102 or data used by the such applications executed by the server 102. The database 110 may be hosted on any number of computing devices comprising a non-transitory machine-readable storage medium and capable of performing the various tasks described herein. As shown in FIG. 1, the database 110 may be accessed by the server 102 and other servers and devices of the system 100 via one or more networks 112. The database 110 may be hosted on the same physical computing device functioning as the server 102 and/or functioning as other servers and devices of the system 100.

Figure 2:
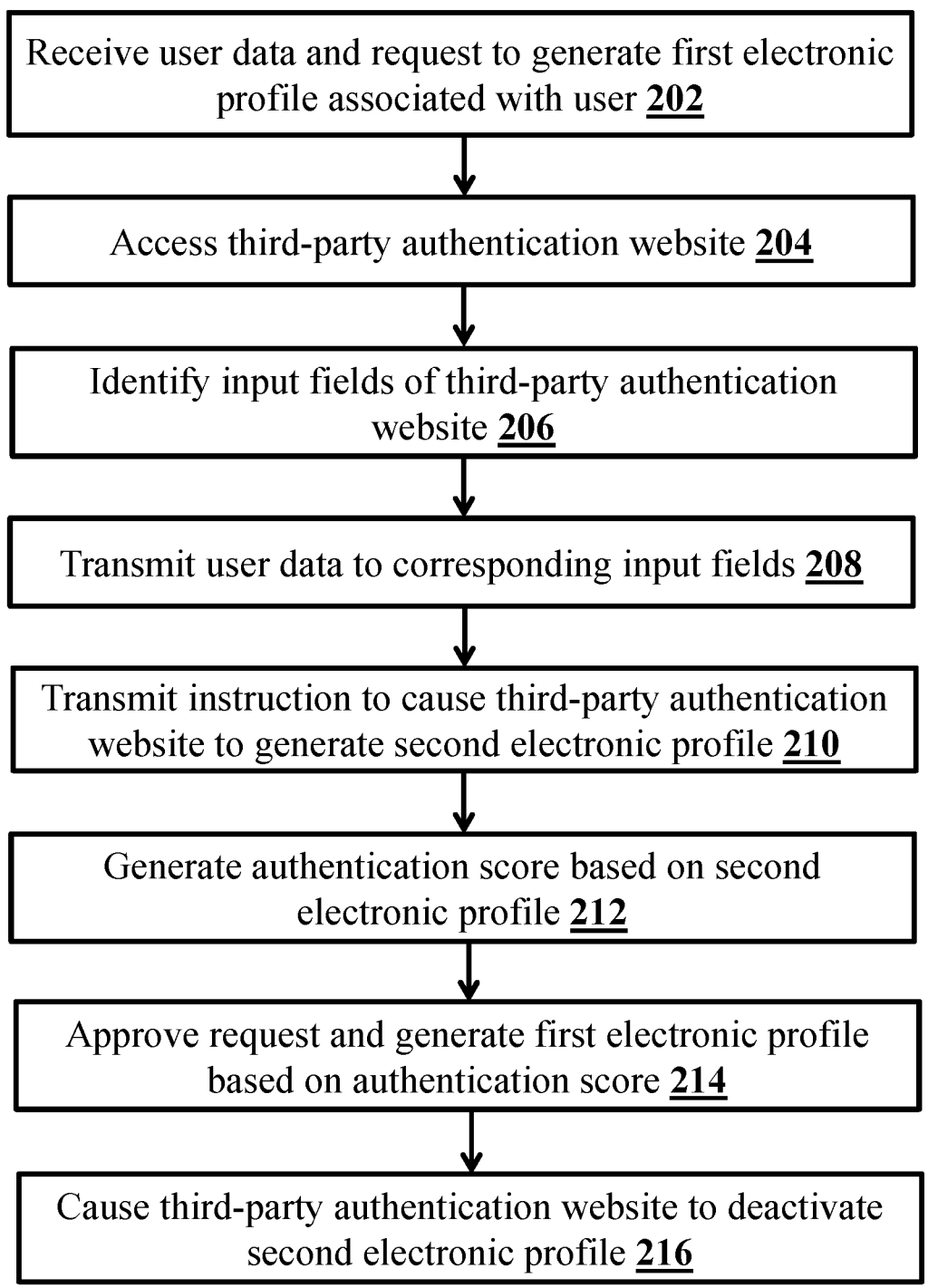
FIG. 2 shows a method for authenticating identification data of a user, according to an embodiment.

FIG. 2 shows execution steps of authenticating identification data of a user, according to a method 200. The method 200 shown in FIG. 2 comprises execution steps 202, 204, 206, 208, 210, 212, 214, and 216. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by two server computers in this embodiment. However, one having skill in the art will appreciate that, in some embodiments, steps may be executed by any number of computing devices operating in a distributed computing environment. In some cases, a computer executing one or more steps may be programmed to execute various other, unrelated features.

In a first step 202, a server may receive a request to generate a first electronic profile from an electronic device. The first electronic profile is an account profile of the user with a financial company. The electronic device is operated by a user. The server may also receive data inputs from the electronic device. The data inputs are answers to multiple input elements within a questionnaire. The questionnaire may be a computer-generated form. Each input element may correspond to a question. In one embodiment, the server may receive each data input from the electronic device immediately after the data input is being inputted by the user in the electronic device. In another embodiment, the electronic device may transmit the data inputs to the server once the electronic device has received the data inputs for a predetermined number of questions by the user. In yet another embodiment, the electronic device may transmit the data inputs to the server once the electronic device has received the data inputs for a predetermined type of questions by the user. Accordingly, the server may start receiving the data inputs from the electronic device as the user is still answering unanswered questions within the questionnaire displayed on the electronic device. On receiving the data inputs, the server may categorize the data inputs based on sensitive content contained within the data inputs, and then store categorized data inputs in a database.

In a next step 204, in a background process, a server may access a third-party authentication website hosted by a third-party authentication server such that the user operating the electronic device isn't aware about the communication with the third-party authentication server. As the server is interacting with the electronic device to receive the data inputs, simultaneously, the server may also transmit a request to the third-party authentication server to access the third-party authentication website. The request may include credentials to access the third-party authentication website. The third-party authentication server may evaluate the credentials, and accordingly approve or decline the request. Upon successful evaluation of the credentials, the third-party authentication server may allow the server to access the content of the third-party authentication website.

In a next step 206, a server may identify input fields on webpages of the third-party authentication website. The input fields may include a personal information field, a company information field, etc. In one embodiment, the server may use a web-crawling technique to web-crawl each webpage of the third-party authentication website, and identify the input fields on each webpage. In another embodiment, the server may execute a scraping algorithm to scrape each webpage of the third-party authentication website, and identify the input fields on each webpage.

The server may utilize specific and pre-defined interface attributes to identify the input fields of the third party webpage. The third-party authentication server may generate a unique interface for one or more servers where attributes of the input/data fields are predefined based on each subscriber (e.g., each server). For instance, when the server connects to the third-party authentication server through its webpage, the third party authentication server identifies the server and displays a predefined webpage specific to that particular server. The predefined webpage may include input fields recognized by the server. The third-party authentication server may transmit a set of instructions to the server defining attributes of each input/data element. In this embodiment, the server is no longer required to execute a web crawling or data scraping protocol. Instead, the server retrieves the set of instructions received from the third-party authentication server and identifies each input element.

The server may user optical character recognition, natural language processing and artificial intelligence techniques to identify specific types of information elements within each webpage. Once the information elements are identified, the server is able to locate the appropriate input fields and their locations on a selected webpage.

In a next step 208, a server may parse the various data inputs to identify information corresponding to various inputs fields within the third-party authentication website. The server may then transmit information from the various data inputs to corresponding input fields within the third-party authentication website. For instance, the server may search the database to identify most appropriate answer from the various data inputs for each input field. Then the server may populate each input field with the most appropriate answer.

In a next step 210, a third-party authentication server may generate a second electronic profile of the user. In another embodiment, a server may transmit a first instruction to a third-party authentication server. On receipt of the first instruction, the third-party authentication server may cause the third-party authentication website to generate the second electronic profile of the user. The second electronic profile is an authentication profile of the user. The authentication profile may include multiple attributes. The multiple attributes may correspond to a financial record of the user, a criminal record of the user, a social record of the user, etc.

In a next step 212, a third-party authentication server may generate an authentication score for the user based on the second electronic profile. The third-party authentication server may execute a scoring algorithm to calculate the authentication score for the user based on evaluation of each attribute of the second electronic profile. In alternate embodiments, the third-party authentication server may execute the scoring algorithm to calculate a score for each attribute of the second electronic profile. The third-party authentication server may then average the score for each attribute to calculate an overall authentication score corresponding to the second electronic profile. The third-party authentication server may then transmit the authentication score to the server.

The third-party authentication server may require additional information (in addition to the data received from the user) to generate the authentication score. Accordingly, while generating the score by executing the scoring algorithm, the third-party authentication server may generate a list of additional information required. The third-party authentication server may then transmit the list to the server. The server may then generate one or more prompts directing the user to input a response corresponding to the additional information requested by the third-party authentication server. In a non-limiting example, while executing the scoring algorithm, the third-party authentication server identifies that the user's driver license (DL) number is needed to generate an accurate authentication score. The third-party authentication server then notifies the server or the webserver (e.g., server 102 and/or webserver 104, as depicted in FIG. 1) that the user's DL number is needed (e.g., transmits a notification to the server). In response, the server/webserver generates a prompt (e.g., pop-up window or directing the user to a new webpage). The prompt may display the additional information needed (DL number). The prompt may also include an input component (e.g., text input fields, radio buttons, or drop down menus) configured to receive the user's response. Upon the user inputting his or her DL number, the server/webserver may then transmit the inputted response to the third-party authentication server.

In a next step 214, a server may compare the authentication score with a predetermined threshold score stored in a database. When the authentication score does not satisfy the predetermined threshold value, the server may request the third-party authentication server to perform additional verification steps to verify the data inputs of the user. In some embodiments, the server may also transmit new data inputs along with the request that may assist the third-party authentication server to verify the previous as well these new data inputs of the user. The third-party authentication server may use the new data inputs to update the authentication profile of the user. The third-party authentication server may also update authentication score based on the updated authentication profile.

Upon the authentication score satisfying the predetermined threshold value, the server may approve the request. The server may then generate the first electronic profile of the user. The server will then display the first electronic profile on a user interface of the electronic device. In some embodiments, the server may monitor the activity of the user, and only when the user have finished answering all the questions within the questionnaire, the server may display the first electronic profile on the user interface. Accordingly, as the user is working on the questionnaire, the server is able to concurrently verify information presented by the user as responses to the questionnaire before the user may complete the questionnaire, and is thereby in position to approve or decline the request of the user once the user may finish the questionnaire. Since the user may be able to get prompt result for the request, it saves considerable time for the user and greatly improves the overall customer experience.

In a next step 216, while the first electronic profile is being displayed on the user interface of the electronic device, simultaneously, the server may also transmit a second instruction to the third-party authentication server. On receipt of the second instruction, the third-party authentication server may cause the third-party authentication website to deactivate the second electronic profile. The third-party authentication server may also delete all data associated with the second electronic profile from the database.

Non-Limiting Example

A customer visits a bank's website to open a new bank account. The customer inputs information into the website. In the background and while the customer is completing an electronic form on the website, the bank's server sends a request to a third-party authentication website to generate an account for the customer. The third-party authentication website authenticates the customer and sends an authentication message to the bank's server. The bank's server then deactivates the account for the customer at the third-party authentication website. The customer completes the process on the bank's website and the bank's server authenticates the customer, all occurring without the customer knowing that the bank's server created and then deactivated an account for the customer at the third-party authentication website.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
  upon displaying, on a web-based application executing on an electronic device, a questionnaire comprising a plurality of input elements, receiving, by a server from the electronic device, a plurality of data inputs, the server further receiving a request to generate a first electronic profile associated with a user operating the electronic device;
  while the questionnaire is displayed on the web-based application and before the server receives data inputs corresponding to all of the plurality of input elements, causing, by the server using a background process not visible to the user, a third-party authentication website to generate a second electronic profile associated with the user by:
    accessing, by the server, the third-party authentication website;
    identifying, by the server, one or more input fields of the third-party authentication website;

transmitting, by the server, the plurality of data inputs to corresponding input fields within the third-party authentication website; and transmitting, by the server, a first instruction to cause the third-party authentication website to generate the second electronic profile, wherein the third-party authentication website generates an authentication score for the user based on the second electronic profile;

upon the server determining that the authentication score satisfies a predetermined threshold value, generating, by the server, the first electronic profile using the plurality of data inputs;

upon completion of the plurality of input elements of the questionnaire and while a representation of the first electronic profile is displayed on the web-based application executing on the electronic device, causing, by the server using the background process not visible to the user, the third-party authentication website to deactivate the second electronic profile by:

accessing, by the server, the third-party authentication website; and transmitting, by the server, a second instruction to cause the third-party authentication website to deactivate the second electronic profile.

2. The method of claim 1, further comprising web-crawling, by the server, the third-party authentication website to identify the one or more input fields.

3. The method of claim 1, further comprising scraping, by the server, the third-party authentication website to identify the one or more input fields.

4. The method of claim 1, further comprising executing, by the server, a scoring algorithm to calculate the authentication score for the user based on evaluation of each attribute of the second electronic profile.

5. The method of claim 4, further comprising executing, by the server, the scoring algorithm to calculate a score for each attribute of the second electronic profile.

6. The method of claim 5, further comprising averaging, by the server, the score for each attribute to calculate the authentication score.

7. The method of claim 1, wherein the server continuously receive new data inputs as the user submits answers in the questionnaire.

8. The method of claim 7, further comprising transmitting, by the server, the new data inputs to corresponding input fields within the third-part authentication website.

9. The method of claim 8, further comprising updating, by the server, information within the second electronic profile based on the new data inputs.

10. The method of claim 9, further comprising updating, by the server, the authentication score based on updated second electronic profile.

11. A system comprising:

a server comprising a hardware processor configured to:

upon displaying on a web-based application executing on an electronic device, a questionnaire comprising a plurality of input elements, receive from the electronic device a plurality of data inputs, the server further receiving a request to generate a first electronic profile associated with a user operating the electronic device;

while the questionnaire is displayed on the web-based application and before the server receives data inputs corresponding to all of the plurality of input elements, cause using a background process not visible to the user a third-party authentication website to generate a second electronic profile associated with the user by:

accessing the third-party authentication website;

identifying one or more input fields of the third-party authentication website;

transmitting the plurality of data inputs to corresponding input fields within the third-party authentication website; and transmitting a first instruction to cause the third-party authentication website to generate the second electronic profile, wherein the third-party authentication website generates an authentication score for the user based on the second electronic profile;

upon the server determining that the authentication score satisfies a predetermined threshold value, generate the first electronic profile using the plurality of data inputs;

upon completion of the plurality of input elements of the questionnaire and while a representation of the first electronic profile is displayed on the web-based application executing on the electronic device, cause using the background process not visible to the user the third-party authentication website to deactivate the second electronic profile by:

accessing the third-party authentication website; and transmitting a second instruction to cause the third-party authentication website to deactivate the second electronic profile.

12. The system of claim 11, wherein the server is further configured to web-crawl the third-party authentication website to identify the one or more input fields.

13. The system of claim 11, wherein the server is further configured to scrape the third-party authentication website to identify the one or more input fields.

14. The system of claim 11, wherein the server is further configured to execute a scoring algorithm to calculate the authentication score for the user based on evaluation of each attribute of the second electronic profile.

15. The system of claim 14, wherein the server is further configured to execute the scoring algorithm to calculate a score for each attribute of the second electronic profile.

16. The system of claim 15, wherein the server is further configured to average the score for each attribute to calculate the authentication score.

17. The system of claim 11, wherein the server continuously receive new data inputs as the user submits answers in the questionnaire.

18. The system of claim 17, wherein the server is further configured to transmit the new data inputs to corresponding input fields within the third-part authentication website.

19. The system of claim 18, wherein the server is further configured to update information within the second electronic profile based on the new data inputs.

20. The system of claim 19, wherein the server is further configured to update the authentication score based on updated second electronic profile.

* * * * *